Patented Feb. 3, 1948

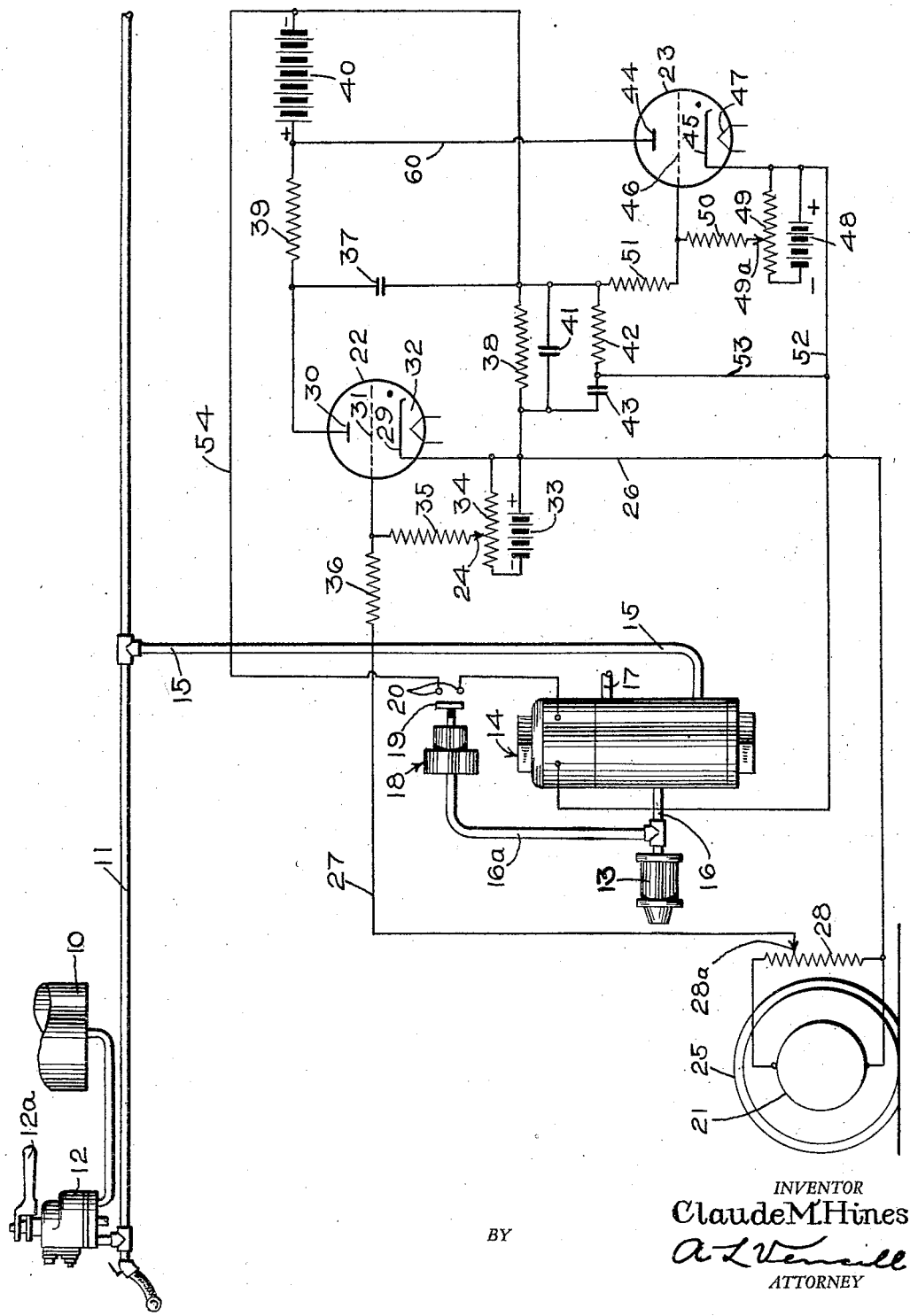

2,435,310

UNITED STATES PATENT OFFICE 2,435,310

ELECTRONIC BRAKE CONTROL APPARATUS

Claude M. Hines, Pittsburgh, Pa., assignor to The Westinghouse Air Brake Company, Wilmerding, Pa., a corporation of Pennsylvania Application October 26, 1944, Serial No. 560,390

8 Claims. (Cl. 303—21)

This invention relates to an improved electrical apparatus employing electronic means for detecting the slipping condition of a vehicle wheel, such as a railway car wheel, and for controlling the brakes associated with such wheel in a manner to prevent sliding of the wheel.

The term "slipping" as used herein in connection with vehicle wheels refers to the rotation of the vehicle wheels at a speed different from that corresponding to the vehicle speed at a given instant. The term "sliding" refers to the dragging of the wheel along a road surface or rail in a locked or non-rotative condition.

Various types of mechanical and electrical apparatus have been employed for the purpose of detecting the slipping condition of vehicle wheels on the basis of the abnormal and excessive rate of deceleration during the slipping period. It has been demonstrated that the deceleration of a vehicle car wheel at a rate exceeding ten miles per hour per second is a positive indication of a wheel slipping condition. Apparatus, heretofore known and proposed, has been arranged to effect a release of the brakes associated with a slipping wheel so rapidly and so promptly that the wheel will be restored to a speed corresponding to the vehicle speed without actually reducing in speed sufficiently to attain a locked or sliding condition. By thus controlling the brakes, the wheels will not be damaged by sliding along the road surface nor will the stopping distance be appreciably lengthened.

In my prior application, Serial No. 525,025, filed March 4, 1944 (now Patent Number 2,389,049, issued November 13, 1945) under the title of "Electronic brake control apparatus," I have disclosed electrical apparatus, including an electron discharge device, for the purpose of detecting excessive retardation of a railway car wheel and for controlling the brakes associated with the wheel in a manner to prevent wheel sliding. Such electrical apparatus further includes an axle-driven mechanical commutator having a number of contact segments engaged by associated brushes and functioning as a switching device for alternately charging and discharging condensers. The brushes however are subject to wear, particularly because of the shocks and jars incident to travel along track rails, and require frequent servicing or replacement.

My present invention constitutes an improvement over that disclosed in my said prior copending application in that the need for a mechanical commutator and brushes is eliminated by an arrangement including an axle-driven alternating current generator, of a type having no brushes, and electronic means controlled thereby. The advantage of this arrangement over that disclosed in my prior application is that the need for servicing or replacement of commutator brushes is eliminated, a very important item from a practical standpoint.

It is an object of my present invention to provide an improved brake control system of the general type disclosed in my above mentioned copending application but characterized by an arrangement not requiring a mechanical commutator and associated brushes.

More specifically, it is an object of my invention to provide a brake control system of the type indicated in the foregoing object and further characterized in that an electronic commutator apparatus is provided.

Other objects and advantages of this invention will appear in the following more detailed description thereof taken in connection with the accompanying drawing, the single figure of which is a diagrammatic view of fluid pressure brake equipment embodying electrical apparatus in accordance with my present invention.

Description

My present invention is applicable to and is intended for use in connection with standard fluid pressure brake equipment for railroad cars and trains. For simplicity however, the brake equipment shown in the drawing is of the simple and well-known straight-air type.

The fluid pressure brake equipment shown comprises a fluid pressure supply reservoir 10, a straight-air or control pipe 11, a self-lapping brake valve 12, a brake cylinder 13 and an electro-responsive control valve device 14.

The straight-air pipe 11 extends from end to end of a car. In case of a train of cars, the straight-air pipe extends from end to end of the train, being made up of sections of pipe on successive cars that are connected by conventional hose couplings (not shown).

The self-lapping brake valve device 12 may be of the type disclosed in Patent 2,042,112, to Ewing K. Lynn, Jr. and Rankin J. Bush. Briefly, it comprises a self-lapping mechanism including a supply valve, an exhaust valve, and a rotary operating shaft to which a handle 12a is secured. The self-lapping mechanism is arranged to supply fluid under pressure from the reservoir 10 to the straight-air pipe 11 when the operating handle 12a of the brake valve 12 is operated out of its normal release position into a brake application zone, and to release fluid under pressure from the straight-air pipe to the atmosphere when the operating handle is returned toward release position. The pressure established in the straight-air pipe will vary substantially according to the degree of displacement of the brake valve handle out of its release position. This self-lapping type of brake valve has a pressure maintaining characteristic for maintaining the pressure in the straight-air pipe at a value that corresponds to the handle position at all times, notwithstanding a tendency for the pressure in the straight-air pipe to reduce, such as may result from leakage.

The brake cylinder 13 is operative upon the supply of fluid under pressure thereto from the straight-air pipe 11 under the control of electroresponsive valve device 14 to apply braking force to a wheel 25 of the vehicle through the medium of suitable brake rigging, levers and brake shoes (not shown). The electroresponsive valve device 14 is operative to release fluid under pressure from the brake cylinder for preventing the sliding of the vehicle wheel, as hereinafter explained.

The electroresponsive valve device 14 is a standard magnet valve device having a magnet winding and a double seated valve. The double seated valve is normally biased and seated against its upper seat by spring pressure. The double seated valve is moved from its upper seat and into engagement with the lower seat when the magnet winding is energized as hereinafter explained. With the magnet winding normally deenergized, the magnet valve 14 establishes communication from branch pipe 15, connected to the straight-air pipe 11, to a pipe 16 leading to the brake cylinder 13. When the magnet winding is energized upon the occurrence of a wheel slip condition, as hereinafter described, the supply of fluid under pressure from pipe 15 to the brake cylinder is cut off and an exhaust communication is established between pipe 16 and an atmospheric port 17 through which fluid under pressure in the brake cylinder is rapidly vented. Brake forces active on the vehicle wheel are thus quickly reduced to permit the wheel to promptly return to the normal rotational condition.

A fluid pressure operated switch device 18 of any suitable construction, hereafter called the pressure switch, is connected as by a short pipe 16a to brake cylinder pipe 16 in a manner to be operatively responsive to variations of fluid pressure in the brake cylinder 13. Pressure switch 18 may comprise a movable contact 19 actuated into contact with a pair of stationary insulated contacts 20 in response to a pressure in the brake cylinder exceeding a certain low pressure, such as five pounds per square inch. Conversely, contact 19 disengages contacts 20 only in response to reduction of brake cylinder pressure below five pounds per square inch. The purpose of pressure switch 18 will be explained hereinafter.

My invention further includes electrical apparatus responsive to rotation of the vehicle wheel and effective, when a slipping condition of the wheel 25 occurs, to control the electroresponsive valve device 14 to effect the release of brake forces active on the wheel, thereby relieving the objectional wheel slip condition.

This electrical apparatus includes essentially an alternating current generator 21, a first electron discharge device 22 and a second electron discharge device 23.

The generator 21 may be of the type comprising a laminated non-magnetized steel rotor coupled to the end of the wheel axle and driven according to the rotational speed of the wheel 25, and a stator comprising a magnetic core having salient pole pieces and including sections in the form of permanent magnets with connected windings associated with the pole pieces. The output voltage of the generator 21 taken from the terminals of the stator winding is constantly impressed on a resistor 28 that is connected across the output terminals of the generator. Moreover, the frequency of the output voltage is proportional to the rotative speed of the generator and the wheel by which the generator is being driven.

The electron discharge device 22, hereinafter referred to as tube 22, may be in the form of a thyratron gas-filled tube. This device includes the usual cathode 29, anode 30, control grid 31 and cathode heating element 32.

Associated with the tube 22 is a grid bias control means including a battery 33 and a potentiometer resistor 34. The potentiometer resistor 34 is connected across the terminals of the battery 33. The positive terminal of the battery 33 and thus the corresponding end of potentiometer resistor 34 is connected to the cathode 29 of the tube 22 by a conductor 26.

A normal negative potential bias is imposed on the grid 31 by means of a connection between the grid 31 and the potentiometer resistor 34 including a bias control resistor 35 and an adjustable contact 24 engaging the resistor 34 for suitable adjustment of the normal grid bias. With a normal negative bias maintained on the grid, the tube 22 remains nonconductive.

Variation of the normal biasing potential on the grid 31 of tube 22 for the purpose of making the tube conductive at successive intervals varying the frequency according to the speed of the wheel 25 is effected by impressing a suitable portion of the voltage on resistor 28 associated with the axle-driven generator 21 across the grid and cathode terminals of the tube 22. Thus one end of resistor 28 may be connected by conductor 26 to the cathode 29 of tube 22 and an adjustable contact 28a, engaging the resistor 28, may be connected to the grid 31 of tube 22 by a wire 27 including a control resistor 36.

It will be understood that as a result of the reversal of the direction of flow of current through resistor 28 occurring between successive half cycles of the output voltage of the alternating current generator 21, the polarity of the voltage across the resistor 28 is correspondingly reversed. Consequently during one half cycle of the output voltage of generator 21, the potential impressed on the grid 31 from resistor 28 and corresponding to the potential drop across resistor 35 will be positive and during the next half cycle the potential impressed on the grid due to resistor 35 will be negative. When a positive potential is thus impressed on the grid, the normal bias voltage on the grid 31 is reduced for the reason that the potential drop across resistor 35 is in opposition to and partially nullifies the normal negative potential impressed on the grid from potentiometer resistor 34. When the biasing potential on the grid is thus reduced, the tube becomes conductive as will hereinafter be more fully explained. When a negative potential from resistor 35 is impressed on grid 31, the normal bias potential on the grid is correspondingly increased and thus the tube remains non-conductive.

While omitted from the drawing for simplicity, it will be understood that any suitable arrangement may be provided for energizing the cathode heating element 32 of tube 22.

Also associated with the tube 22 is a condenser 37 and a resistor 38. The condenser 37 is connected in series with a current-limiting resistor 39 across the terminals of a source of direct-current supply, such as a storage battery 40. The anode 30 and cathode 29 of tube 22 are connected in series with a resistor 38 across the condenser 37.

During the nonconductive period of the tube 22, the condenser 37 is charged to the voltage of battery 40. During the conductive period, the condenser 37 is discharged through the resistor 38. As the condenser 37 is discharged, the voltage impressed across the anode and cathode of the tube 22 drops below that required to sustain flow of current through the tube and the flow of current through resistor 38 therefore ceases.

It can now be seen that as the wheel 25 rotates, the tube 22 becomes conductive only during one half of each cycle of voltage delivered by generator 21, thereby causing the condenser 37 to be alternately charged by battery 40 and discharged through the resistor 38 at a corresponding frequency. In view of the fact that condenser 37 becomes fully charged during each non-conductive period of the tube 22 and discharge a substantially uniform amount of electrical charge through a resistor 38 during each conductive period of tube 22, it will be seen that the effective value of the pulsating direct current flowing through resistor 38 is substantially proportional to the frequency of the output voltage of generator 21 and correspondingly to the rotative speed of the wheel. Thus the voltage drop or potential established across resistor 38 is substantially proportional to the rotative speed of the wheel 25.

A condenser 41 is connected in parallel with resistor 38 for the purpose of smoothing out the pulsations of direct current flowing through the resistor.

Also connected in parallel with resistor 38 are a series connected resistor 42 and a condenser 43. The condenser 43 is charged to a voltage equal to the potential across resistor 38 so long as the vehicle wheel 25 rotates at a constant speed. When the wheel 25 accelerates in speed, the voltage drop across resistor 38 increases correspondingly. Due to the instantaneous difference thus created between the voltage across resistor 38 and the potential to which condenser 43 is charged, a charging flow of current through resistor 42 is produced, thereby creating a potential drop across resistor 42, of negative polarity at the right-hand end of resistor 42, substantially proportional to the rate of acceleration of the wheel. Conversely, when the wheel 25 decelerates in speed, the voltage drop across resistor 38 correspondingly reduces. Due to the instantaneous differential between the voltage drop across resistor 38 and the potential to which condenser 43 is charged, condenser 43 is discharged locally through resistors 38 and 42, the current flow through resistor 42 thus produced being in the opposite direction to that during acceleration of the wheel. A potential drop is accordingly produced across resistor 42, of positive polarity at the right-hand end of resistor 42, substantially proportional to the rate of deceleration of the wheel.

The variation of potential across resistor 42 and the polarity thereof is utilized in the manner hereinafter explained to control operation of the second tube 23.

The second tube 23 is also of the Thyratron gas-filled type. This device comprises an anode 44, a cathode 45, a control grid 46 and a cathode heating element 47.

Associated with tube 23 is a grid bias control means including a battery 48 and a potentiometer resistor 49 connected across the terminals of the battery. The positive terminal of the battery 48 and the corresponding end of the resistor 49 are connected to the cathode of the tube 23 as by a wire 52. The grid 46 is connected to the potentiometer resistor 49 by a connection including a bias control resistor 50 and an adjustable contact 49a engaging resistor 49. A normal negative potential is impressed on the grid 46 from resistor 49 to normally maintain the tube 23 nonconductive.

The normal negative potential bias on grid 46 is varied for the purpose of rendering the tube 23 conductive according to the polarity and degree of the potential created across resistor 42. To accomplish this, the right-hand end of resistor 42 is connected to the grid 46 through a current limiting resistor 51. The opposite end of resistor 42, that is, the end connected to one terminal of condenser 43, is connected to the cathode 45 of tube 23 by wire 52 and a branch wire 53.

It will thus be apparent that when the potential at the right-hand end of resistor 42 becomes negative, as it does during acceleration of the wheel 25 in the manner previously explained, the increased negative bias on the grid 46 maintains the tube non-conductive. When the potential at the right-hand end of resistor 42 becomes positive, as it does during deceleration of the wheel 25 in the manner previously explained, the normal negative bias on grid 46 is correspondingly reduced. If the wheel decelerates at a sufficiently rapid rate, selected for purpose of my present invention as ten miles per hour per second, occurring only when the wheel 25 slips, the positive potential at the right-hand of resistor 42 sufficiently reduces the normal negative bias on grid 46 to cause the tube 23 to become conductive as more fully explained hereinafter.

The anode 44 of tube 23 is connected to the positive terminal of a source of direct-current supply, such as battery 40, by a wire 60.

The cathode 45 of the tube 23 is correspondingly connected to the negative terminal of the battery 40 by a circuit which extends from the cathode by way of wire 52, the magnet winding of the electro-pneumatic valve device 14, contacts 19 and 20 of the pressure switch 18 (assumed closed) and thence to the negative side of the battery 40 by a wire 54. It can now be seen that the tube 23 and the pressure switch 18 cooperate to control the operation of the electroresponsive valve device 14 to effect a reduction in the brake forces developed by the brake cylinder 13 when slipping of the wheel occurs.

For simplicity the means for energizing the cathode heating element 47 of tube 23 has been omitted from the drawing but it should be understood that such means is provided.

*Operation*

Let it now be assumed that the vehicle is being propelled with the brakes released so that the vehicle wheel 25 is being rotated at a constant speed corresponding to the speed of the vehicle. As previously explained, a voltage drop is thus produced across the resistor 38 proportional to the vehicle speed. At the same time, due to the fact that there is no charging or discharging flow of current to condenser 43, no voltage drop is produced across resistor 42. Thus so long as the vehicle travels at constant speed with brakes released, the normal negative bias on grid 46 of tube 23 is effective to maintain the tube nonconductive.

Let it now be assumed that while the vehicle is in motion with wheels rotating at a speed corresponding to vehicle speed that a brake application is made by moving the operating handle 12a of the self-lapping brake valve 12 to a position in the application zone corresponding to the degree of brake application desired. The straight-air pipe 11 is accordingly charged with fluid under pressure until the pressure in the straight-air pipe is established at a value proportional to the amount of movement of the handle 12a out of its release position. Fluid under pressure thus flows from straight-air pipe 11 by way of pipe 15 through the electroresponsive valve device 14 and pipe 16 to the brake cylinder 13 and to the pressure switch 18. The brake cylinder 13 accordingly operates to apply braking force to the car wheels. At the same time, when the fluid pressure in the brake cylinder 13 increases above five pounds per square inch, as it does whenever a brake application is effected, pressure switch 18 is operated to cause the member 19 to bridge the contacts 20. The circuit for energizing the electroresponsive valve device 14 is thus conditioned, by closing of the contacts of pressure switch 18, for control by the tube 23.

Let it now be further assumed that the braking force exerted on wheel 25 is such as to produce a slipping condition thereof. The tube 23 is accordingly rendered instantly conductive in response to the deceleration of the wheel 25 at a rate exceeding the ten miles per hour per second as previously explained. The previously described circuit for energizing the magnet winding of the electroresponsive valve device 14 is thus established.

The electroresponsive device 14 is accordingly operated to cut off the supply of fluid under pressure from the straight-air pipe 11 to the brake cylinder 13 and to vent fluid under pressure from the brake cylinder to the atmosphere through the atmospheric port 17. Fluid under pressure is vented from the brake cylinder 13 until the pressure switch 18 is operated to separate contact 19 from contacts 20.

Due to the release of fluid under pressure from the brake cylinder and the consequent reduction of braking force, the wheel 25 promptly ceases to decelerate and then accelerates back toward a rotative speed corresponding to the vehicle speed. Ordinarily the wheel will return fully to vehicle speed in the time required to reduce the pressure in the brake cylinder to a value to below five pounds per square inch at which the contacts of pressure switch 18 are separated. As a result of this acceleration of the wheel 25 toward the vehicle speed, the right-hand end of resistor 42 will become of negative potential for the reason previously explained. Such negative potential effective over resistor 51 on the control grid 46 of the tube 23 would ordinarily render the tube non-conductive. However, due to the ionization of gas within the tube 23, the tube remains conductive so long as a flow of current from anode to cathode in the tube 23 continues. The control grid 46 is thus rendered ineffective to control the flow of current through the tube until such time as the flow of current through the tube is terminated. The character of the tube 23 is, therefore, such as to cause the magnet winding of the electroresponsive valve device 14 to remain energized until the contacts 19 and 20 of pressure switch 18 are separated.

When the contacts 19 and 20 of pressure switch 18 separate in response to the reduction of fluid pressure in brake cylinder 13 below five pounds per square inch, thereby interrupting the energizing circuit for the magnet winding of electroresponsive valve device 14 and consequently the flow of current through tube 23, the grid 46 once again regains control.

Upon deenergization of its magnet winding, as just described, the electroresponsive valve device 14 is operated to terminate further venting of fluid under pressure from brake cylinder 13 and to reestablish communication to admit fluid under pressure to the brake cylinder 13 from the straight-air pipe 11, thereby causing a reapplication of the braking forces on the vehicle wheel. Reengagement of contacts 19 and 20 of pressure switch 18 in response to the build-back of pressure in brake cylinder 13 does not effect reclosure of the circuit of the magnet winding of valve device 14 because the circuit is open through tube 23 due to grid 46 now exercising control of current flow through the tube.

Should the wheel 25 again begin to slip in response to reapplication of the brakes thereon as just described, the above operation is repeated. Thus at no time is the wheel permitted to decelerate to a locked or sliding condition.

When the car or train comes to a stop in response to application of the brakes, the brakes remain applied in accordance with the degree of displacement of the brake valve handle out of its brake release position. It will be apparent that this is so because of the pressure maintaining feature of the brake valve 12. Obviously, when the vented brake cylinder is reconnected to the straight-air pipe 11 at the termination of a wheel slip cycle the fluid under pressure so withdrawn from the straight-air pipe tends to effect a reduction of pressure in the straight-air pipe 11. However, the pressure in the straight-air pipe is maintained as previously indicated, in correspondence with the position of the brake valve handle. Of course if the brake valve handle is partially restored back toward brake release position following the occurrence of a wheel slip, the pressure remaining in the brake cylinder 12 will be correspondingly reduced.

When it is desired to release the brakes prior to again starting the car or train, the brake valve handle 12a is restored to brake release position. The pressure in the straight-air pipe 11 and correspondingly in the brake cylinder 13 is vented to atmosphere under the control of brake valve 12, and the brakes on wheel 25 are thus completely released.

It will thus be seen that I have disclosed a fluid pressure brake control system for vehicles, such as railway cars and trains, comprising novel apparatus for controlling the brakes associated with the wheels in a manner to prevent sliding thereof due to braking. The novel apparatus comprises an axle-driven alternating current generator, having no brushes or commutator, which in cooperation with electronic means produces an electrical characteristic in correspondence with a rotative condition of a wheel, such as speed, acceleration, and deceleration. The electrical characteristic produced in response to the abnormally high rate of deceleration of a car wheel occurring only when the wheel slips, is utilized to control additional electronic means which, in turn, is operative to cause reduction in the degree of application of the brakes on a wheel that slips and then reapplication of the brakes thereon, thereby preventing sliding of the wheel.

Having now described my invention, what I claim as new and desire to secure by Letters Patent is:

1. A control system for controlling rotation of a rotary member comprising an alternating current generator driven by said rotary member and having a frequency of output voltage substantially proportional to the rotative speed of the rotary member, a resistor, a condenser, a source of direct-current voltage, an electron discharge device so constructed and arranged as to cause said condenser to be alternately charged by said direct current source and discharged through said resistor repeatedly at a frequency corresponding to the frequency of the output voltage of said generator thereby to establish a voltage drop across said resistor substantially proportional to the rotational speed of the rotary member, and means controlled by variation in the voltage drop across said resistor for controlling the rotation of the rotary member.

2. A control system for controlling rotation of a rotary member comprising an alternating current generator driven by said rotary member for supplying a voltage at a frequency corresponding to the rotative speed of the rotary member, an electron discharge device having an anode, a cathode and a control element, said control element being subject to a normal biasing potential for rendering the anode-cathode path in the device nonconductive and responsive to the variations in instantaneous alternating current voltage delivered by the said generator for rendering the anode-cathode path in said device conductive once each alternating current cycle, a condenser, a resistor, a source of direct-current, said discharge device being effective to cause charging of said condenser from said source when the anode-cathode path thereof is nonconductive and to cause discharge of said condenser through said resistor when said anode-cathode path thereof is conductive, the arrangement being such as to produce a voltage drop across said resistor substantially proportional to the speed of rotation of the rotary member, and means responsive to variations in the voltage drop across said resistor for controlling rotation of said rotary member.

3. In a vehicle brake control system, the combination of means associated with a brakeable wheel of the vehicle for producing an alternating current voltage having a frequency substantially proportional to the rotational speed of the wheel, a resistor, a condenser, a source of direct-current voltage, an electron discharge device under control of said alternating current voltage so constructed and arranged as to cause said condenser to be alternately charged by said source and discharged through said resistor repeatedly at a frequency corresponding to the frequency of the voltage produced by said alternating current voltage producing means thereby to establish a voltage drop across said resistor substantially proportional to the rotative speed of the wheel, and means controlled by variations of the voltage drop across said resistor for controlling the degree of application of the brakes effective on said wheel.

4. In a vehicle brake control system, the combination of means associated with a brakeable wheel of the vehicle for producing an alternating current voltage having a frequency substantially proportional to the rotational speed of the wheel, a resistor, a condenser, a source of direct-current voltage, an electron discharge device under control of said alternating current voltage so constructed and arranged as to cause said condenser to be alternately charged by said source and discharged through said resistor repeatedly at a frequency corresponding to the frequency of the voltage produced by said alternating current voltage producing means thereby to establish a voltage drop across said resistor substantially proportional to the rotative speed of the wheel, and means responsive to a predetermined rate of reduction of the voltage drop across said resistor and corresponding to a predetermined rate of deceleration of the wheel for effecting a reduction in the degree of application of the brakes effective on the wheel.

5. In a control system for an equipment including a rotary member and electroresponsive control means operative to govern operation of said rotary member, in combination, electronic means operative to establish an electrical characteristic that is a measure of a rotative condition of said rotary member, an electron discharge device arranged to control energization of said electroresponsive control means, said discharge device having a control element on which a normal biasing voltage of one polarity is imposed to render the device nonconductive, and means responsive to the rate of variation in the electrical characteristic produced by the said electronic means for subjecting the control element of said electron discharge device to a corresponding voltage of a polarity opposed to said one polarity for rendering the said device conductive when the said electrical characteristic changes at a rate exceeding a certain rate.

6. In a vehicle wheel brake system having electroresponsive brake controlling means operable, after an application of the brakes has been effected, to reduce the degree of the brake application, in combination, electronic control apparatus constructed and arranged to establish an electrical characteristic that is a measure of a rotative condition of the vehicle wheel, a source of electrical energy, an electron discharge device having a control member subject to a potential determined by said electrical characteristic, and an anode-cathode circuit connected to said source and to said brake controlling means, and means for impressing a biasing voltage on said control member for normally rendering the second said electron discharge device nonconductive, said electron discharge device being rendered conductive by alteration of the potential impressed on said control member in response to a predetermined change in said electrical characteristic.

7. In a vehicle brake system having a control device operative, while the brakes are applied, to reduce the degree of application of the brakes associated with a wheel of the vehicle, in combination, electronic apparatus operative to detect the rate of rotational deceleration of the wheel including a control circuit in which a potential substantially proportional to the rate of deceleration is developed, electrical means for effecting operation of said control device, and an electron discharge device constructed and arranged to control said electrical means in accordance with the potential in said control circuit.

8. In a vehicle brake system having a control device operative, while the brakes are applied, to reduce the degree of application of the brakes associated with the wheel of the vehicle, in combination, electronic apparatus operative to detect the rate of rotational deceleration of the wheels including a control circuit on which is impressed a potential substantially proportional to the rate of deceleration of the wheel, electrical means for effecting operation of said control device, means for controlling the energization of said electrical means, said last means comprising a source of electrical energy and an electron discharge device having an anode, a cathode, and a control member, means for normally impressing a bias potential on said control member tending to render said discharge device nonconductive, and means associated with said control circuit for impressing a potential on said control member rendering said discharge device conductive in response to deceleration of the wheel at a predetermined rate.

CLAUDE M. HINES.

REFERENCES CITED

The following references are of record in the file of this patent:

UNITED STATES PATENTS

| Number | Name | Date |
|---|---|---|
| 2,334,863 | Canetta et al. | Dec. 23, 1943 |
| 2,321,992 | Canetta et al. | June 15, 1943 |
| 2,277,035 | Canetta et al. | Mar. 24, 1942 |
| 2,270,414 | Canetta et al. | Jan. 20, 1942 |
| 2,283,608 | McCune | May 19, 1942 |
| 2,164,114 | Kolb | June 27, 1939 |
| 2,322,022 | Hewitt | June 15, 1943 |
| 2,246,905 | Uehling | June 24, 1941 |